US011392546B1

(12) United States Patent
Gopalka et al.

(10) Patent No.: US 11,392,546 B1
(45) Date of Patent: *Jul. 19, 2022

(54) METHOD TO USE PREVIOUSLY-OCCUPIED INODES AND ASSOCIATED DATA STRUCTURES TO IMPROVE FILE CREATION PERFORMANCE

(71) Applicant: Veritas Technologies LLC, Santa Clara, CA (US)

(72) Inventors: Abhishek Kumar Gopalka, Pune (IN); Anindya Banerjee, Pune (IN); Pooja Mahadik, Ratnagiri (IN); Sanjay Kumar Jain, Pune (IN); Shirish Vijayvargiya, Pune (IN)

(73) Assignee: Veritas Technologies LLC, Santa Clara, CA (US)

( * ) Notice: Subject to any disclaimer, the term of this patent is extended or adjusted under 35 U.S.C. 154(b) by 178 days.

This patent is subject to a terminal disclaimer.

(21) Appl. No.: 16/837,046

(22) Filed: Apr. 1, 2020

Related U.S. Application Data

(63) Continuation of application No. 15/476,173, filed on Mar. 31, 2017, now Pat. No. 10,635,637.

(51) Int. Cl.
*G06F 16/00* (2019.01)
*G06F 16/13* (2019.01)
*G06F 16/16* (2019.01)
*G06F 11/14* (2006.01)

(52) U.S. Cl.
CPC .......... *G06F 16/13* (2019.01); *G06F 11/1451* (2013.01); *G06F 16/162* (2019.01); *G06F 2201/84* (2013.01)

(58) Field of Classification Search
CPC .... G06F 16/13; G06F 11/1451; G06F 16/162; G06F 2201/84; G06F 16/128; G06F 16/27

See application file for complete search history.

(56) References Cited

U.S. PATENT DOCUMENTS

| 5,828,876 A * | 10/1998 | Fish ................ G06F 16/1858 710/200 |
| 7,809,776 B1 * | 10/2010 | Witte ................ G06F 16/1734 707/825 |
| 7,873,619 B1 * | 1/2011 | Faibish ................ G06F 16/13 707/823 |

(Continued)

*Primary Examiner* — Noosha Arjomandi

(57) ABSTRACT

Various systems and methods are provided for using various in-core and on-disk data structures to improve the file creation process through the use of previously-occupied inodes. For example, one method involves updating an in-core data structure in response to receiving a command to delete a first file, such that a first node is assigned to the first file, the in-core data structure is stored in a non-persistent computer-readable storage medium, the in-core data structure comprises a plurality of entries, each of the entries comprises information identifying a respective inode of a plurality of inodes as being available, and the updating the in-core data structure comprises storing information regarding the first inode in a first entry of the plurality of entries; and creating a second file, where the creating comprises assigning the first inode to the second file using the information regarding the first inode stored in the first entry.

20 Claims, 10 Drawing Sheets

(56) References Cited

U.S. PATENT DOCUMENTS

| | | | | |
|---|---|---|---|---|
| 8,285,758 B1* | 10/2012 | Bono | ................... | G06F 16/122 |
| | | | | 707/822 |
| 9,367,806 B1* | 6/2016 | Cosic | ...................... | G10L 21/10 |
| 10,235,293 B2* | 3/2019 | Patel | ................... | G06F 16/245 |
| 2004/0236798 A1* | 11/2004 | Srinivasan | ............ | G06F 16/954 |
| 2005/0165716 A1* | 7/2005 | Huang | ................ | H04L 67/2823 |
| 2005/0246397 A1* | 11/2005 | Edwards | ................. | G06F 16/10 |
| 2006/0075294 A1* | 4/2006 | Ma | ...................... | G06F 11/1458 |
| | | | | 714/13 |
| 2007/0067256 A1* | 3/2007 | Zayas | ..................... | G06F 16/13 |
| 2007/0266056 A1* | 11/2007 | Stacey | ................... | G06F 16/185 |
| | | | | 707/999.203 |
| 2009/0019047 A1* | 1/2009 | Anderson | ............ | G06F 16/1774 |
| 2012/0109921 A1* | 5/2012 | James | ...................... | G06F 16/13 |
| | | | | 707/705 |
| 2014/0181040 A1* | 6/2014 | Montulli | ............. | G06F 11/1451 |
| | | | | 707/652 |
| 2016/0154592 A1* | 6/2016 | Goodman | ............. | G06F 3/0617 |
| | | | | 711/165 |
| 2016/0171056 A1* | 6/2016 | Steinemann | ......... | G06F 16/2228 |
| | | | | 707/769 |
| 2016/0224578 A1* | 8/2016 | Wideman | ............... | G06F 16/16 |
| 2016/0246683 A1* | 8/2016 | Vijayan | ................. | G06F 16/184 |
| 2016/0259808 A1* | 9/2016 | Miwa | ................... | G06F 16/178 |
| 2017/0091296 A1* | 3/2017 | Beard | .................. | G06F 16/1865 |
| 2017/0220586 A1* | 8/2017 | Zuckerman | ......... | G06F 16/2246 |
| 2019/0114117 A1* | 4/2019 | Patel | ................... | G06F 16/1767 |

\* cited by examiner

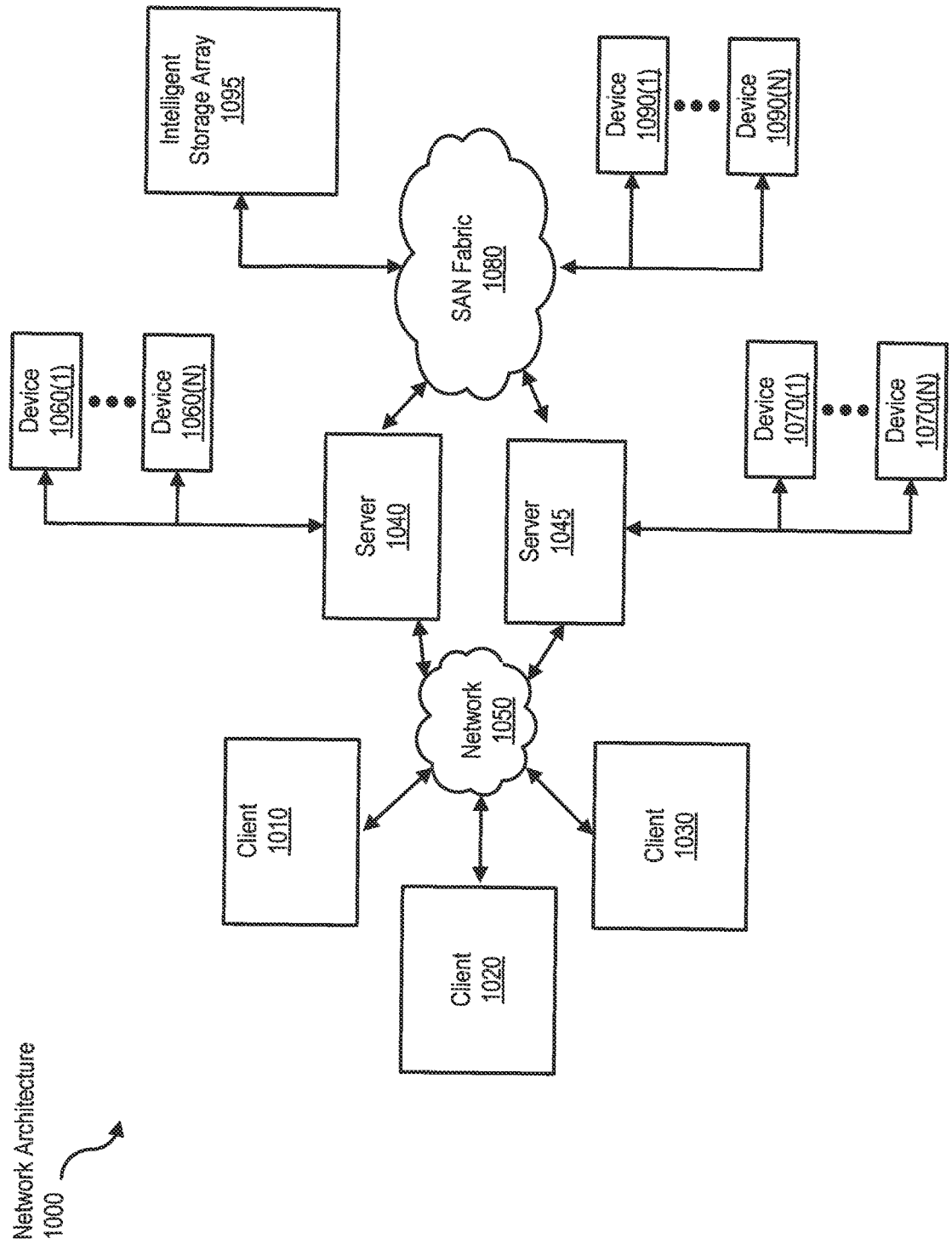

METHOD TO USE PREVIOUSLY-OCCUPIED INODES AND ASSOCIATED DATA STRUCTURES TO IMPROVE FILE CREATION PERFORMANCE

CROSS-REFERENCE TO RELATED APPLICATIONS

The present patent application is a continuation of U.S. patent application Ser. No. 15/476,173, filed on Mar. 31, 2017, which is entitled "Method to Use Previously-Occupied Inodes and Associated Data Structures to Improve File Creation Performance," and which is incorporated by reference herein in its entirety and for all purposes.

BACKGROUND OF THE DISCLOSURE

Field of Endeavor

Computer technology and file systems, and more particularly, the use of inodes and associated data structures in the file creation process.

State of the Technology

A certain amount of storage space for inodes is statically allocated when a file system is created. For instance, a system administrator may create a 100 GB file system. In that example, the file system may allocate 1% of a file system space for inode storage. Thus, in a file system of size 100 GB, the file system may allocate 1 GB, or approximately 1024 MB, for inode storage. Since this allocation occurs when the file system was created, the amount of space that is allocated is static once the file system has been created. As a result, this procedure is often inefficient, at least in part because a file system generally does not know in advance how many files or what size files will be created in that file system. For instance, if 2,000,000 fairly small files are ultimately created, then 2,000,000 inodes would be needed. Because each inode is generally the same size (e.g., 256 bytes), a fairly significant amount of memory may be needed for the inodes (e.g., 512,000,000 bytes, which is approximately 488.3 MB). In other situations, however, perhaps a user only creates twenty very large files, on the order of 2 GB each in size. In this situation, the system would only need twenty inodes. And since inodes are only 256 bytes each, only around 5 KB of memory would be needed to store those inodes. Thus, a large portion of the 1 GB of space allocated for inode storage would be wasted in this example.

Subsequently, methods were developed to dynamically allocate inodes after the file system was created. One such option is to create inodes as needed during the file creation process. Doing so, however, unnecessarily adds time to the file creation process, and thereby slows down the process, often at the precise moment when users are actively waiting for the file creation process to complete. For instance, and among other inefficiencies, the process of creating an inode requires searching the file system space to find a free location in which to store the inode. Depending on the size of the file system, and depending on how the space happens to be allocated at any given moment, this process can take a relatively long time. For instance, a file system may have to search through many megabytes (or even gigabytes) of space to find an available block that can be used to dynamically allocate the new inode. Therefore, when a system does find a suitable amount of available space (e.g., a block of storage of a sufficient size), the system often pre-allocates a block of inodes at once. For example, the system may pre-allocate 32 or 64 inodes at the same time. However, even this process is less inefficient than would be ideal, particularly since it requires tracking the inodes to determine their location and availability.

More specifically, such a dynamic allocation system requires the system to track which of the pre-allocated inodes are free, and which of the pre-allocated inodes are in use (e.g., assigned to a file). Such information is generally tracked by using an on-disk data structure, such as a bitmap. In such a data structure, one bit is generally allotted for each existing inode (including both free and allocated inodes). For instance, if 1,000,000 inodes currently exist in a file system, then the bitmap would need 1,000,000 bits to track those inodes. When a system receives a request to create a new file, this on-disk data structure would be used to determine if any inodes were free, and if so, where those inodes were located within a file system space. Making such a determination requires search through the bitmap or other data structure, bit by bit, until a free inode is found. Not surprisingly, while this process may be more efficient with respect to file system space usage than the static allocation process, this dynamic process is nevertheless quite inefficient with respect to the time needed to create files and to create and assign inodes.

More specifically, searching an on-disk data structure to determine which previously allocated inodes are available includes at least three significant undesirable results. First among those undesirable results is the reality that reading from disk is generally significantly slower than reading from an in-core memory. Second among those undesirable results is that searching a data structure that contains information about every created inode in a file system will take a relatively significant amount of time on average. When using such a data structure, the system is required to search through the bitmap (or similar data structure), entry by entry, until an available inode is located. Such an operation can be called an "order of n" operation, since the length of time needed to perform that operation will vary, on average, based on the number of n entries in the bitmap. Thus, as the number of allocated inodes grows (including both free and in-use inodes), the average time to find a free inode also increases in proportion to the number of created inodes, again slowing down the file creation process. Third among these undesirable results is the need to serialize requests for inodes in many instances, thereby creating a backlog and slowing down the entire file creation process. For instance, if multiple users all submit file creation requests in close proximity to each other, the system will often have to serialize those requests to avoid assigning the same inode to multiple files. The instant disclosure provides solutions to the aforementioned problems, as well as other useful, novel, and non-obvious improvements over the state of the art.

SUMMARY OF THE DISCLOSURE

The disclosure generally includes methods, computer program products, computer systems, and the like, that provide for improved file creation performance by creating and using previously-occupied inodes in a novel manner. In one embodiment, a file system pre-allocates inodes that may eventually be assigned to a file. When an inode is assigned to a file, the inode is marked as being unavailable in a primary on-disk data structure, such as, e.g., a bitmap. When the file is deleted, reference to the file is removed from the visible directory, but the extents of the file are maintained. Moreover, the primary on-disk data structure is not updated with respect to this file during the deletion process, which results in the inode still being marked as unavailable in the primary on-disk data structure. To facilitate more efficient uses of the inode in the future, among other benefits and uses, the inode is marked as available in an in-core (in memory) data structure, such as, e.g., a list or queue. When a request is received to create a new file, the file will have to be assigned to an inode. Rather than having to create an inode from scratch as part of the file creation process or having to search the slower (and bigger) on-disk data structure to find a free inode, the system can assign the file to a previously-occupied inode by using the much more efficient in-core (in memory) data structure. In one embodiment, the contents of the in-core data structure are also copied to a backup on-disk data structure, which can be used to repopulate the in-core (in memory) data structure in the event of a system shutdown, reboot, or other system failures. In one embodiment, a separate maintenance thread is provided to control the size of the in-core data structure, as well as to prevent any of the previously-occupied inodes from becoming stale or expired.

In slightly more detail, one example embodiment discloses a method that can be performed by a computer or a component thereof, such as, e.g., a file system. For instance, this example method begins by assigning a file to a pre-allocated inode and updating a primary on-disk data structure to indicate that the inode is unavailable. In one embodiment, an inode can be an on-disk data structure that stores information pertaining to a file. In one embodiment, the primary on-disk data structure is a bitmap. In one embodiment, the bitmap contains a number of bits equivalent to the maximum number of inodes that can be allocated on a particular computer system, a number which will vary by system and can be configured based on factors such as the file system size. In one embodiment, the bitmap can use one value (e.g., "0") to indicate that a corresponding inode is available and a different value (e.g., "1") to indicate that the corresponding inode is unavailable. This procedure can be applied to multiple files and multiple inodes within a file system.

In one example embodiment, the system can also receive a command to delete one of the files that had been assigned to an inode. In response to this command to delete this file, the system can delete the file from the visible directory. During this deletion process, in one embodiment a flag can also be set in the inode to indicate that an extended operation (or "extop") may need to be performed on the inode at some later time. For instance, the extop flag may indicate that the inode is set for, potentially, a deferred deletion at some point in the future. At the instant time, however, the inode will not be deleted. Moreover, the system can retain the file extents in the inode, since those extents can often be used by a subsequent file that may be assigned to that same inode. During this deletion process, the on-disk data structure is not updated with respect to the inode that had been previously assigned to the deleted file. As a result, the inode still appears to be in use from the file system's perspective, and thus will not be deleted at this time. However, the in-core data structure will be updated to indicate that the previously-occupied ("pre-occupied") inode is now available to be assigned to a subsequent new file. In one embodiment, the in-core data structure stores information in a first-in, first-out ("FIFO") manner, and can take the form of a list or a queue. In this embodiment, the newly-available (but previously-occupied) inode will be added to the end of the list or queue, such that the previously-occupied inodes that have been available for the longest time will be found at the front of the list or queue. Thus, the data structure used in such an embodiment helps the system to minimize the amount of previously-occupied inodes that become stale or expired, by assigning the "oldest" previously-occupied inode to newly created files.

In one example embodiment, the system can also receive a command to create a new file and/or a command to assign an inode to a new file. In one embodiment, the system can use the in-core data structure to assign a previously-occupied inode to the new file. In one embodiment, the first inode in the in-core data structure will be assigned to the new file. As indicated above, in this embodiment, the first inode in the in-core data structure will generally be the "oldest" previously-occupied inode, that is, the previously-occupied inode that became available the longest time ago (among the previously-occupied inodes that are referenced in the in-core data structure).

In one example embodiment, the system also provides a separate maintenance thread (or threads, although the maintenance thread will generally be referred to in the singular for ease of discussion herein). The maintenance thread includes a separate thread (or threads) that are used to maintain an adequate size and freshness of the in-core data structure. In particular, the maintenance thread can run checks to determine whether the number of entries in the in-core data structure is at least as great as a minimum threshold value, and not greater than a maximum threshold value. Since the number of entries in the in-core data structure should correspond to the number of previously-occupied inodes that are now available to be assigned to a new file, this check should ensure that the proper range of such previously-occupied inodes is available. If the maintenance thread determines that too few previously-occupied inodes are available (e.g., that there are too few entries in the in-core data structure), then the maintenance thread can instruct the system to create additional inodes and to take additional steps consistent with the disclosure provided herein (e.g., updating the proper data structures, and so forth). If the maintenance thread determines that too many previously-occupied inodes are available (e.g., that there are too many entries in the in-core data structure), the maintenance thread can effectuate the deletion of excess and unneeded previously-occupied inodes.

In addition, in one embodiment the maintenance thread can also determine if any of the previously-occupied inodes have become stale or expired. Previously-occupied inodes may expire or become stale if one or more of the previously-occupied inodes have remained unoccupied for a specified amount of time (e.g., 15 minutes) without being assigned to a new file. In one embodiment, where a FIFO data structure is used, this determination can be made by analyzing the first (i.e., oldest) entry in the data structure. If the first entry is found to be expired or stale, then other entries may also have to be analyzed to determine where the appropriate cut off should occur. Once the maintenance thread determines which previously-occupied inodes, if any, are stale or expired and need to be deleted, the maintenance thread can effectuate the deletion of those previously-occupied inodes.

In one example embodiment, the system also provides a backup on-disk data structure that can be used in the event of a system shutdown, or other failure. In one embodiment, this backup on-disk data structure can take the form of a bitmap. In one embodiment, this backup on-disk data structure will be updated on a regular basis (or as otherwise needed or appropriate) to reflect the contents of the in-core data structure. This backup on-disk data structure will not generally be used to assign previously-occupied inodes to new files, because accessing the in-core memory structure will generally be faster than reading from disk. However, because the in-core memory structure will generally not be stored in a persistent memory, the backup on-disk data structure has the advantage of being persistent and thus will retain the information stored therein in the event of a system shutdown, reboot, power loss, or similar event. As a result, in one embodiment, this backup on-disk data structure is used to repopulate the in-core data structure following a system shutdown, reboot, power loss, or other similar event. Various extop flags can also be used during the unmounting and mounting processes that may be related to such an event, in order to ensure that the appropriate previously-occupied inodes are retained by the system during the recovery from the system shutdown or power loss, or other similar process.

The foregoing is a summary and thus contains, by necessity, simplifications, generalizations and omissions of detail, consequently those skilled in the art will appreciate that the summary is illustrative only and is not intended to be in any way limiting. Other aspects, inventive features, and advantages of the present disclosure, as defined solely by the claims, will become apparent in the non-limiting detailed description set forth below.

BRIEF DESCRIPTION OF THE DRAWINGS

The embodiments of the present application may be better understood, and its numerous objects, features, and advantages made apparent to those skilled in the art by referencing the accompanying drawings.

FIG. 10 is a block diagram of a networked system, illustrating how various computing devices can communicate via a network, according to one embodiment of the present disclosure.

Figure 1:
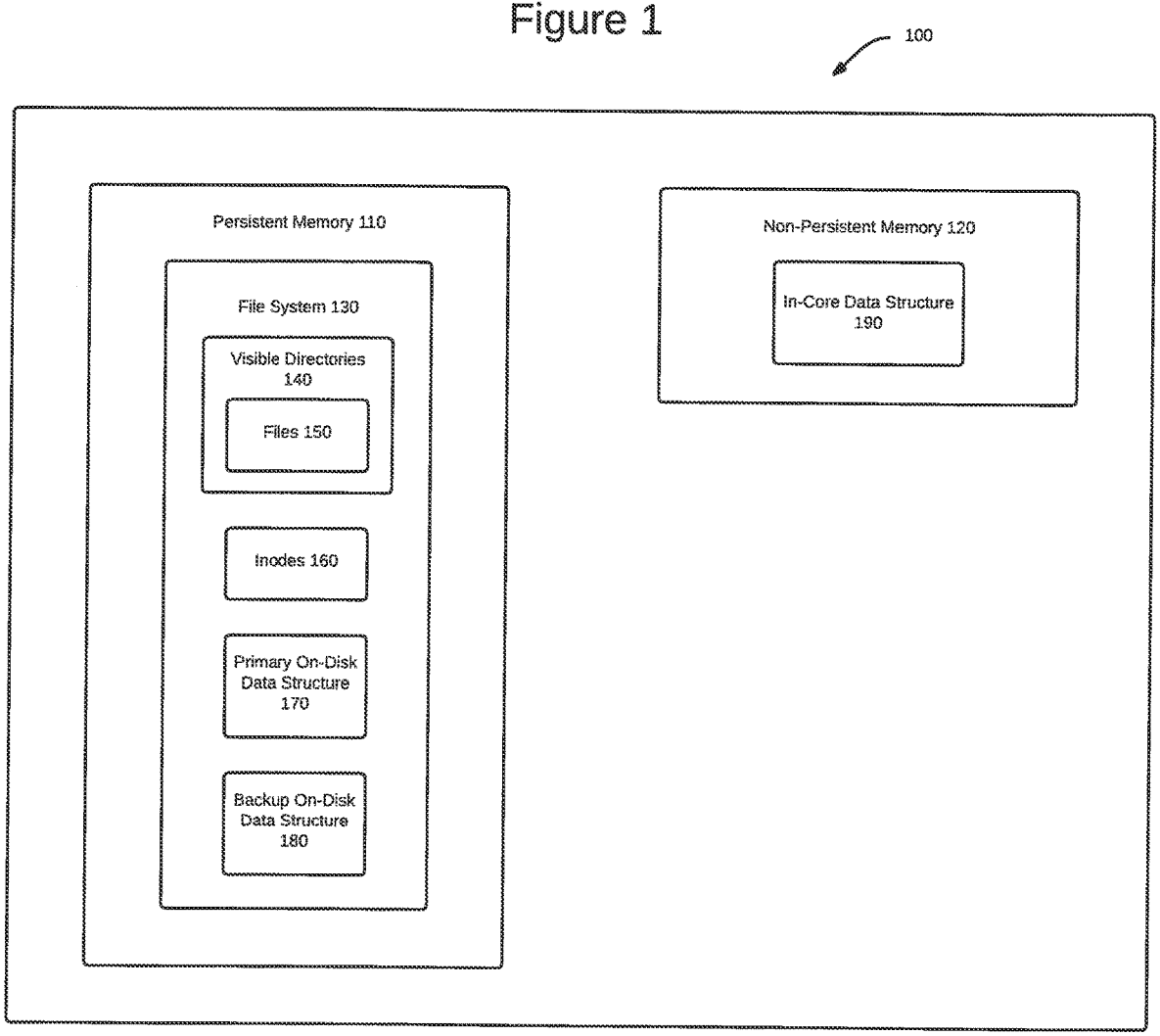
FIG. 1 is a block diagram depicting a computer system that includes both a persistent memory and a non-persistent memory, among other features and components, according to one embodiment of this disclosure.

While the embodiments of the present disclosure are susceptible to various modifications and alternative forms, specific embodiments are provided as examples in the drawings and detailed description. It should be understood that the drawings and detailed description are not intended to limit the embodiments to the particular form disclosed. Instead, the disclosure is intended to cover all modifications, equivalents and alternatives falling within the spirit and scope of the disclosure as defined by the appended claims.

DETAILED DESCRIPTION

The present disclosure describes methods, computer program products, computer systems, and the like that provide for increase performance during the file creation process. More specifically, the present disclosure provides for the use of in-core data structures and on-disk bitmaps to efficiently allocate and assign inodes, thereby providing significant performance increases during the file creation process. The present disclosure also provides for the maintenance of such in-core data structures and on-disk data structures, as well as the use of such data structures to efficiently recover from a system failure, reboot, or other shutdown.

FIG. 1 shows a computer system 100 that includes both a persistent memory 110 as well as a non-persistent memory 120. Persistent memory 110 can be a hard disk drive, flash drive, or solid state hard drive, among other available forms of persistent memory. One key characteristic of persistent memory 110, so far as this disclosure is concerned, is that persistent memory 110 generally retains the data stored thereon during a system shutdown, power loss, or similar event. (As is the case with all memory, persistent memory 110 may obviously lose the data stored thereon if that data becomes corrupted or infected by a virus, if the persistent memory device itself fails or is destroyed, or if other such events occur. Again, for purposes of this disclosure, persistent memory 110 must generally retain the data stored thereon during a system shutdown, power loss, or similar event—but persistent memory 110 does not necessarily have to perfectly retain all data at all times and through all events.) Persistent memory may also be referred to in this disclosure, or the in claims associated with this disclosure, as a non-transient computer-readable storage medium, as "on-disk" memory, or by a similar term. Contrasted with persistent memory 110, non-persistent memory 120 is characterized (again, for purposes of this disclosure) as being a type of memory that generally does not retain the data stored thereon during or through a system shutdown, power loss, or similar event. In one embodiment, non-persistent memory 120 can take the form of RAM or other such forms of non-persistent memory. Non-persistent memory may also be referred to in this disclosure, or the in claims associated with this disclosure, as RAM, system memory, "in-core memory," or by a similar term. Although persistent memory 110, non-persistent memory 120, and the various other memory types and locations described herein are often referred to as "memory" for ease of discussion, in practice each of the memories discussed herein can be any type of computer-readable storage medium. Moreover, the various memories discussed herein need not be the same type of computer-readable storage medium, and typically will not all be the same type of computer-readable storage medium. In addition to the foregoing distinctions, when compared to each other, access times for non-persistent in-core memory (e.g., RAM or system memory) are typically significantly faster than access times for persistent on-disk memory (e.g., a hard disk drive), often by orders of magnitude.

As can be seen in FIG. 1, persistent memory 110 includes a file system 130, including visible directories 140, files 150 and inodes 160. The file system can be any file system, although in one embodiment discussed herein, the file system is the VERITAS FILE SYSTEM (VxFS). Visible directories 140 and files 150 can be any visible directories and files, as would be understood in the art. Although not expressly shown in FIG. 1, a visible directory can also include visible subdirectories, metadata, and various other information and data structures as needed by the system. In one embodiment, each visible directory can include a list of file names and inode numbers, among other information.

Inodes 160 are discussed in more detail herein, but in short, can be thought of as a data structure that stores various information about a file, although not necessarily the file itself or the name of the file. Inodes are typically 256 bytes in size, although they can also be 512 bytes. In certain embodiments, inodes can be configured to be other sizes. While visible directories and files are typically visible to a user in the normal course of events, inodes are typically not displayed to a user in the normal course of using a file system or operating system. Information about the inodes may still be accessed by a user in certain instances, such as by issuing various commands in a terminal-type environment, but they are not typically displayed as part of the general operation of a file system, as would be the case with visible directories and files.

In addition to the aforementioned elements, persistent memory 110 also includes a primary on-disk data structure 170 and a backup on-disk data structure 180. These data structures are discussed in significantly more detail throughout this disclosure, and therefore will only be briefly addressed here. In one embodiment, the primary on-disk data structure 170 takes the form of a bitmap. In other embodiments, the primary on-disk data structure can be a data structure other than a bitmap. Regardless of the specific data structure that is used, one of the key characteristics of the primary on-disk data structure (other than the fact that it is stored on-disk, in a persistent memory) is that it stores information about every currently-existing inode. (or, alternatively, that it stores information about a predetermined number of inodes, which may exceed the number of inodes that currently exist at any given time.) The content of the primary on-disk data structure is expressed particularly in contrast to the in-core data structure, the latter of which will be discussed in more detail below, but generally includes information about certain inodes that are available, but generally does not include any information about inodes that are not currently available.

In one embodiment, the backup on-disk data structure 180 takes the form of a bitmap. In other embodiments, the backup on-disk data structure 180 can be a list, queue, or other first-in, first-out ("FIFO") type of data structure. In other embodiments, the backup on-disk data structure 180 can be a different data structure. Regardless of the specific data structure that is used, one of the key characteristics of the backup on-disk data structure (other than the fact that it is stored on-disk, in a persistent memory) is that it stores information that serves as a backup of the in-core data structure, rather than storing information about every currently-existing inode as is the case with the primary on-disk data structure. Moreover, the backup on-disk data structure must be stored in a persistent memory that will not be lost or erased if the system shuts down or otherwise loses power. As discussed elsewhere in this disclosure, the backup on-disk data structure is used to repopulate the in-core data structure following a system shutdown, or in any other situation where the in-core data structure is erased or the in-core data structure's contents become unavailable. Therefore, storing the backup on-disk data structure in a persistent memory is necessary because this data structure must retain its contents if the system shuts down or otherwise loses power.

As can also be seen in FIG. 1, non-persistent memory 120 stores in-core data structure 190. Because non-persistent memory 120 (referred to herein as an "in-core" memory) does not retain its contents when power is lost (such as, e.g., in the event of a system shut down or other failure or power loss), the in-core data structure will likewise lose its contents when the power is lost. However, despite this functionality, the in-core data structure does have the advantage of providing for significantly faster access times than the primary on-disk data structure and the backup on-disk data structure due to the fact that the non-persistent (i.e., "in-core") memory in which the in-core data structure is stored allows for significantly faster access times than a persistent memory, such as a hard disk drive. Moreover, the drawbacks of the non-persistent nature of this memory are alleviated by methods and systems such as those described herein through the use of the backup on-disk data structure, which is discussed in greater detail throughout the present disclosure.

In one embodiment, the in-core data structure takes the form of a list, queue, or other FIFO type of data structure. In other embodiments, the in-core data structure can be a different data structure. Regardless of the specific data structure that is used, one of the key characteristics of the in-core data structure (other than the fact that it is stored in a memory that is typically significantly faster to access than a persistent memory) is that this data structure only stores information about inodes that have been previously allocated but are currently available (as opposed to storing information about all inodes in the system, as would be the case with the primary on-disk data structure; nothing about the foregoing statement should be construed as in any way implying that the in-core data structure cannot store any other information, such as metadata, location information, and so forth). Another key characteristic of the in-core data structure is that, in one embodiment, this data structure stores information in a FIFO manner. As such, the information about the oldest pre-occupied inode will always be found at the front of the in-core data structure, and the information about the newest pre-occupied inode will always be found at the end of the in-core data structure. As a result, when using this data structure to assign an inode to a new file, the system can simply read the information from the first entry in the in-core data structure to determine which inode to assign to the file, thereby ensuring that the oldest inode is assigned first, and also minimizing the time needed to locate the appropriate inode to assign. This structure and functionality substantially improves the process of assigning inodes to new files. For instance, the use of a FIFO data structure enables the system to assign the first inode (an "order of 1" operation) in the data structure to the new file, rather than having to search through a potentially-lengthy data structure to determine which inodes are free. Heretofore, information for every inode had to be searched through to find a first available inode, a process which is an "order of n" operation. Whereas an order of 1 operation will always take a fairly consistent (and relatively minimal) time, an order of n operation can take substantially longer, particularly as the number of inodes ("n") increases. The specifics of this assignment process are discussed in additional detail elsewhere herein.

The aforementioned elements of file system 100 were included in FIG. 1, and discussed in this disclosure, because of their applicability to the rest of this disclosure. Of course, file system 100 can, and generally will, include various other components and functionality, such as are common to file systems and/or are needed thereby for the operation thereof. As will be appreciated, FIG. 1 is not intended to be limiting in any regard.

Figure 2:
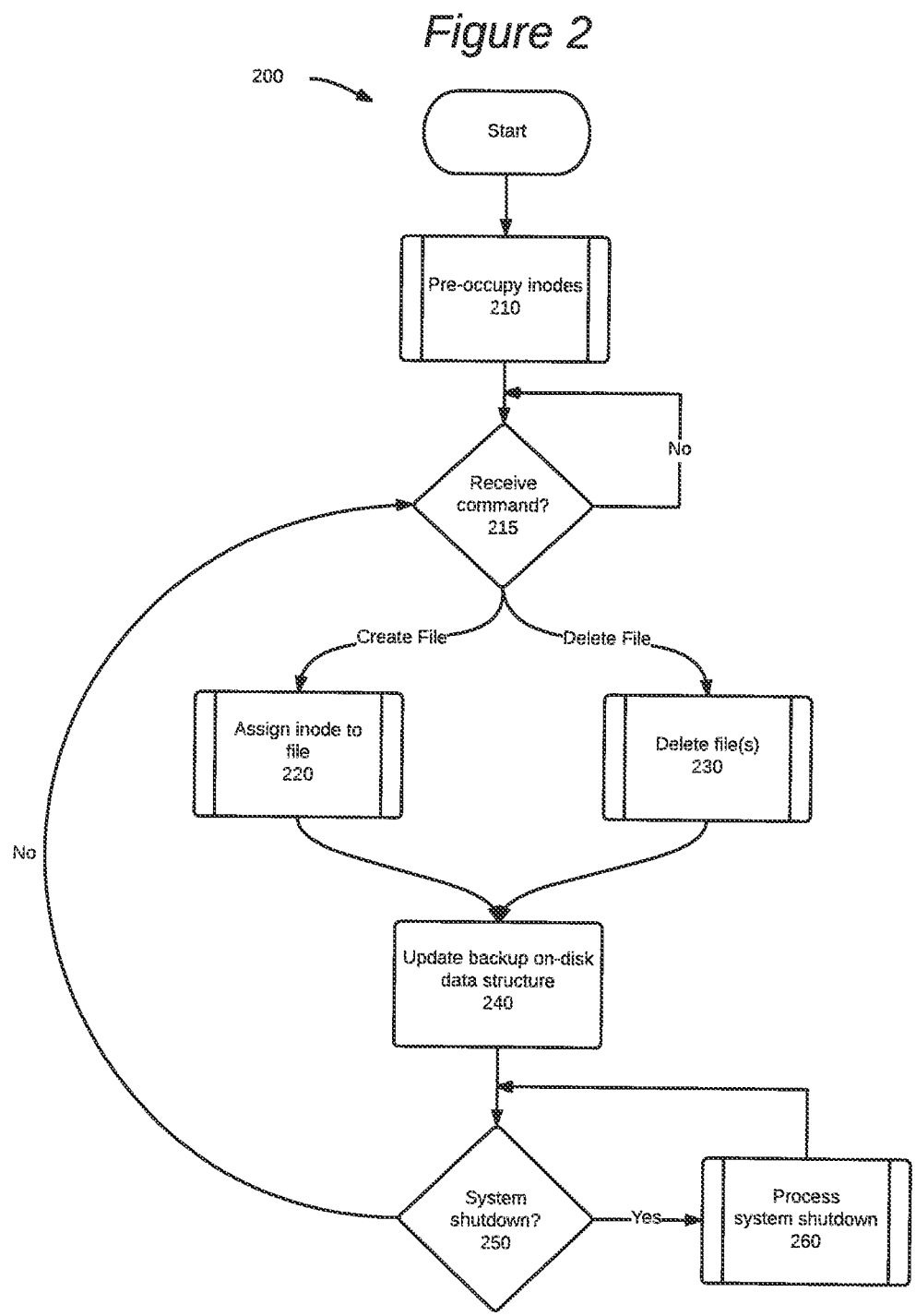
FIG. 2 is a flowchart for using an in-core data structure and on-disk data structures to efficiently allocate and assign inodes, according to one embodiment of this disclosure.

FIG. 2 is a flowchart of a method 200 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 200 is described with reference to elements such as those described in connection with FIG. 1.

FIG. 2 and method 200 primarily provide a high-level overview of the various aspects of this disclosure. As such, the discussion of these materials will necessarily be brief. Rather than providing all of the details at this point of the disclosure, most of the steps discussed herein will point the reader to the enhanced discussion related to that step that are provided below.

With that said, method 200 begins at 210, where one or more inodes can be pre-occupied. Further details about pre-occupying inodes are provided in FIG. 4 and the accompanying discussion of method 400. Although FIG. 4 and method 400 discuss actions that can performed to pre-occupy a single inode, one or more other inodes can also be pre-occupied at this time. When such other inodes are pre-occupied, those inodes can be pre-occupied (and/or pre-allocated prior to being pre-occupied) in chunks, in order to improve performance of the system and future file creation requests. However, in certain situations, such functionality can experience certain of the difficulties discussed above. As a result, it may be preferable for certain embodiments to perform such functionality when the file system is created, before any inodes have been assigned (or, at least, before a minimum number of inodes have been assigned) to any files.

At 215, the system waits for a command to be received. In one embodiment, this step will loop until a command is received. If step 215 receives a command to create a file (or a command to assign an inode to a file, or a similar command), method 200 proceeds to step 220. In step 220, method 200 performs one or more steps to assign an inode to a file. Further details about step 220 are provided in FIG. 4 and the accompanying discussion of method 400. If step 215 receives a command to delete a file (or a similar command), method 200 proceeds to step 230. In step 230, method 200 performs one or more steps that are invoked when a file is deleted. Further details about the deletion of files in conjunction with this disclosure are provided in FIG. 5 and the accompanying discussion of method 500.

Method 200 also depicts step 240, which is invoked to update the backup on-disk data structure, such as when an inode is assigned to a file per step 220, or when a file is deleted per step 230, among other possibilities. Step 240 may also be called by the maintenance thread (discussed in more detail below), e.g., when the maintenance thread determines either that less than a minimum number of inodes are available, or that more than a maximum number of inodes are available. In any event, step 240 operates similarly to step 450, which is discussed below. In step 240, the backup on-disk data structure is updated to reflect the updated state of the in-core data structure. In particular, updating the backup on-disk data structure involves, at least, adding information identifying a previously-occupied but currently available inode to the backup on-disk data structure. In one embodiment, the backup on-disk data structure only includes information about inodes that are not in use, rather than including information about all inodes, as is the case with the primary on-disk data structure. In one embodiment, the backup on-disk data structure is a bitmap, although other data structures can be used in other embodiments. In the embodiment where the backup on-disk data structure is a bitmap, the bitmap is updated by setting the bit corresponding to the appropriate inode. For example, a bitmap can include one bit for each inode in the system (including currently occupied inodes as well as pre-occupied inodes). In such a situation, the bitmap can be updated by changing the value of the bit (e.g., from 0 to 1, or vice versa) to indicate that the corresponding inode has been previously occupied but is now available to be assigned to a new file. Regardless of the specific data structure(s) or other techniques that are used, methods and systems such as those described herein accurately track this information, as this backup on-disk data structure is used to repopulate the in-core data structure in the event of a system shutdown, loss of power, or any other event that causes the contents of the in-core data structure to be erased, corrupted, or otherwise become unavailable. In certain embodiments, one or more of the data structures may be updated with respect to the entire number of inodes in one pass, rather than having to update each entry individually. This is particularly applicable to the backup on-disk data structure, which can more efficiently be updated in one pass (after some number of all requisite inodes have been pre-occupied) rather than having to be updated after each individual transaction.

In step 250, method 200 determines if there has been a system shutdown, power loss, fatal error, or any such similar occurrence (collectively, a "system shutdown"). Although this step is depicted as occurring near the end of method 200, this placement is primarily for the ease of explanation, particularly because processing the shutdown (in step 260) requires the use of many of the data structures that were populated and discussed earlier in method 200. In practice, however, a system shutdown can occur at any point during the operation of a computer system, and so such operations can be performed at any point in method 200. In any event, if the determination at 250 indicates that a system shutdown has occurred, then method 200 proceeds to step 260, where the shutdown is processed. Further details regarding step 260 can be found in FIG. 7 and the accompanying discussion of method 700. If step 250 determines that a system shutdown has not occurred, then method 200 loops back to step 215, to await the next command to create or delete a file. Once again, and to be clear, although the steps of method 200 are depicted in a certain order for ease of discussion herein, in practice these steps can be performed or otherwise occur in different orders. In particular, step 250 does not have to occur in every "pass" through method 200, even as step 250 is always possible at any point during the execution of method 200. As but one example, and although this logical flow is not expressly depicted in FIG. 200 (a decision made, again, for ease of discussion herein), in many instances of operation, method 200 will proceed directly from step 240 back to step 215.

Figure 3:
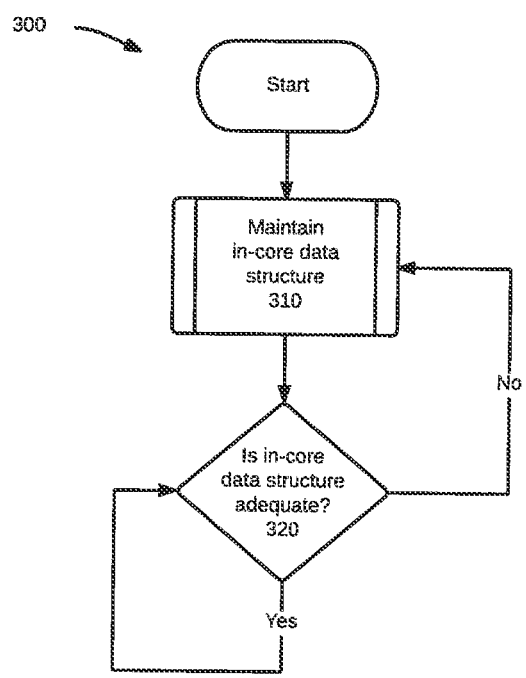
FIG. 3 is a flowchart for using a separate thread to maintain the in-core data structure, according to one embodiment of this disclosure.

FIG. 3 is a flowchart of a method 300 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 300 is described with reference to elements such as those described in connection with FIG. 1.

In one embodiment, the steps of methods 300 (and method 800, which is discussed in more detail below) are performed by one or more threads that are distinct from the thread(s) used to perform the steps of methods 200, 400, 500, 600, and 700. As used herein, the thread used to perform the steps of methods 300 and 800 is referred to as a "maintenance thread." In practice, the maintenance thread may include more than one thread, but is being discussed in the collective singular herein for ease of reference and discussion. In practice, this thread (or threads) may be given a different name, or no name at all.

Figure 8:
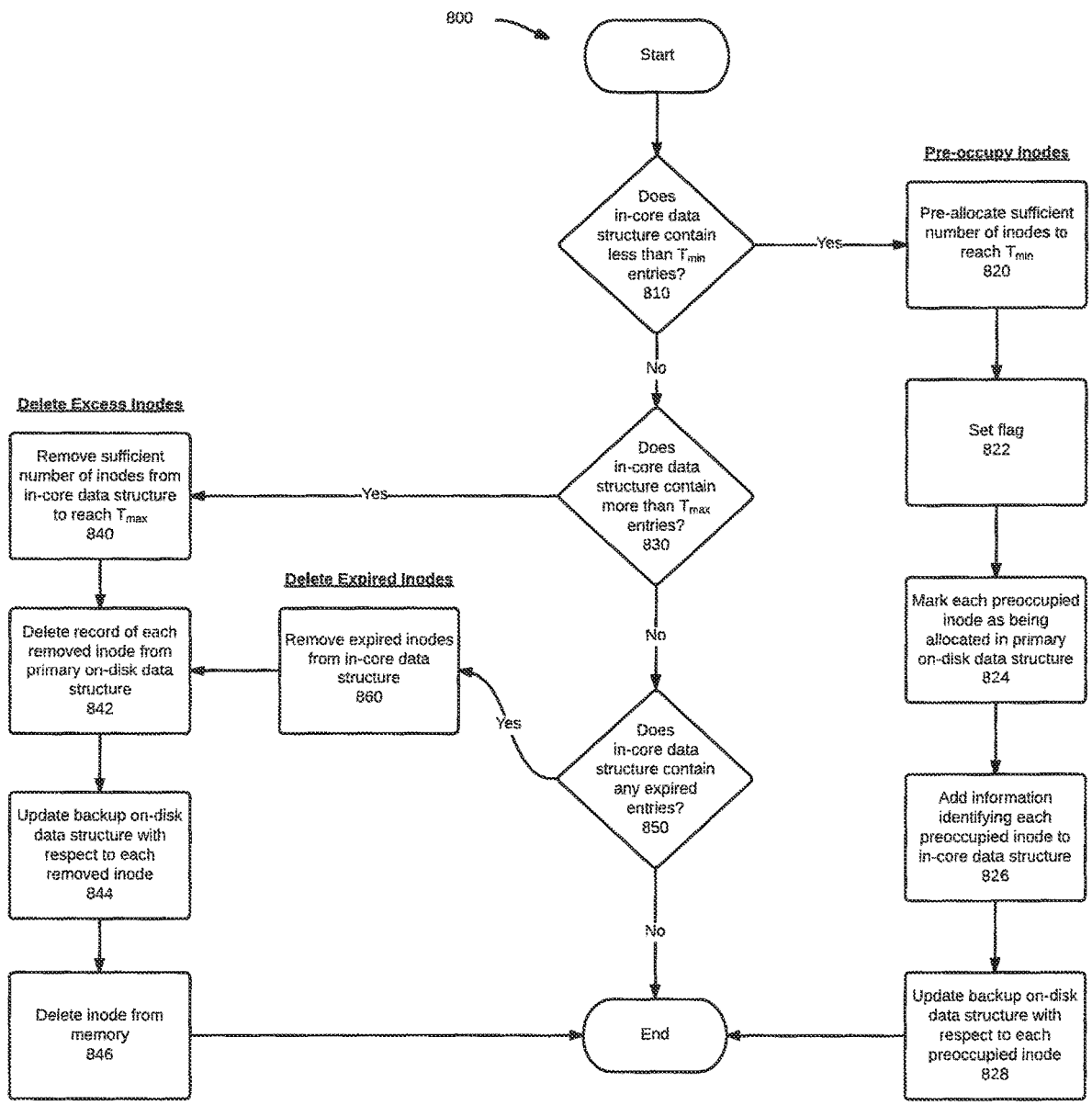
FIG. 8 is a flowchart for maintaining an in-core data structure of available inodes, according to one embodiment of this disclosure.

As depicted, method 300 comprises two primary operations, which are shown in FIG. 3 as being performed in a loop. In practice, these steps may be performed at regular intervals (e.g., every minute) rather than on a continual basis, thereby freeing up the underlying thread to perform other functions as necessary and appropriate. In any event, method begins at 310, where the method performs the series of actions shown in FIG. 8 and the accompanying discussion of method 800, below. These steps are collectively used to maintain the in-core data structure. Method 300 then performs step 320, to determine if the in-core data structure is of an adequate size and does not contain any expired entries. Although shown as a separate step here for ease of reference, in practice this step can include the same decision steps that are shown in FIG. 8, particularly in steps 810, 830, and 850. Moreover, in practice, the order of steps 310 and 320 is not of particular importance. That is, the determination made in 320 can be made prior to executing step 310, the steps can be performed simultaneously or substantially simultaneously, or the steps can be performed in the order shown. In any event, more detail about these steps is provided below, in conjunction with FIG. 8 and the accompanying discussion of method 800.

Figure 4:
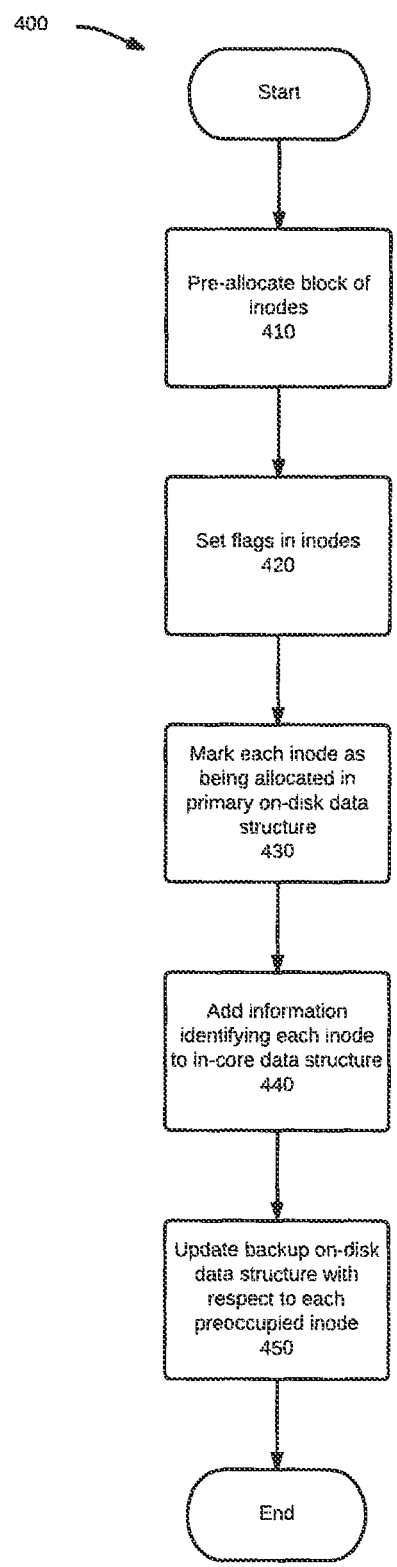
FIG. 4 is a flowchart for pre-occupying inodes, according to one embodiment of this disclosure.

FIG. 4 is a flowchart of a method 400 illustrating various actions performed in connection with one embodiment of the systems and techniques disclosed herein. As will also be appreciated in light of the present disclosure, this method may be modified in order to derive alternative embodiments. Moreover, although the operations in this embodiment are shown in a sequential order, certain operations may occur in a different order than shown, certain operations may be performed concurrently, certain operations may be combined with other operations, and certain operations may be omitted in another embodiment. Method 400 is described with reference to elements such as those described in connection with FIG. 1.

As shown in FIG. 4, method 400 provides additional actions that can be executed to pre-occupy an inode as part of step 210 of FIG. 2. By performing these steps, method 400 can make a new inode appear to the system as being a previously occupied (i.e., "pre-occupied") inode even if a file was never assigned to this inode. The pre-occupation process of method 400 is substantially similar to steps 820 through 828 of FIG. 8, which will be discussed below, but is discussed separately here both for logical completeness as well as the fact that method 400 is not typically performed by the maintenance thread, whereas the steps of method 800 typically are performed by the maintenance thread.

The pre-occupation process of method 400 begins in step 410, where method 400 pre-allocates a batch of one or more inodes. In one embodiment, pre-allocating each inode involves creating (i.e., pre-allocating) an inode without assigning a file to that inode. In one embodiment, the number of inodes in the batch is set by a system administrator, or other user. In other embodiments, the number of inodes in the batch can be predetermined when the method is coded. In other embodiments, the number of inodes in the batch can be set in a different manner. The pre-allocation process of step 410 can also include finding one or more locations in the file system in which the inodes are to be stored.

In step 420, the pre-occupying process of method 400 sets an appropriate extop flag (or other appropriate information) in each pre-allocated inode. As is discussed further below, this extop flag indicates that each inode is not in use (e.g., "free" or "available") even though the inode has been allocated, and also indicates that an extended (or differed) action may be performed on the inode in the future, such as deleting the inode completely (such as when a pre-occupied inode expires, which will be discussed in more detail below). That is, the extop flag can indicate that some processing may need to occur with respect to this inode in the future, but such processing should not occur at this time. For instance, the maintenance thread may instruct the system to delete inode i if the maintenance thread determines that inode i has expired. In that embodiment, the extop flag indicates that the inode is marked for a deferred deletion. In other embodiments, other extended operations can be indicated by the flag used in this step. In one embodiment, the extop flag used in step 420 can be the "IDELICACHE" flag in the Veritas File System (VxFS), which indicates that the inode is marked for a deferred deletion. In other embodiments, other flags or descriptive information can be used in this step.

In 430, the primary on-disk data structure will be updated to indicate that the inode is allocated and therefore unavailable (even though the inode is not actually allocated at this time), as if a file had actually been assigned to the inode. In one embodiment, this primary on-disk data structure takes the form of a bitmap. In one version of this embodiment, the bitmap includes a number of bits that is equal to the number of inodes that currently exist in the file system. In one version of this embodiment, the bitmap includes a number of bits that is equal to the maximum number of potential inodes that can exist in the system at any given time. In these versions of this embodiment, the bitmap contains one value (e.g., "1") to indicate every inode that is allocated, and the bitmap contains a different value (e.g., "0") to indicate every inode that is not currently allocated. In such an embodiment, updating the bitmap to indicate that the inode is allocated would involve setting the appropriate bit to a value of 1. (In other embodiments, other values can be used.) In one embodiment, the "appropriate bit" is the bit whose position in the bitmap is equal to the corresponding inode's position among the inodes. Thus, for example, the first bit in the bitmap would correspond to the first inode, the second bit in the bitmap would correspond to the second inode, and so forth.

In 440, the pre-occupying process also involves adding information identifying each pre-occupied inode to the in-core data structure, thereby indicating that this inode is actually available despite being marked as unavailable (or allocated) in the primary on-disk data structure. In one embodiment, the information identifying each pre-occupied inode can be a pointer. In one embodiment, the information identifying each pre-occupied inode can be other information identifying the location of each respective pre-occupied inode in memory. In one embodiment, the in-core data structure is arranged as a first-in, first-out (FIFO) list, queue, or other FIFO data structure. Particularly in such an embodiment, the information identifying each pre-occupied inode is added to the end of the in-core FIFO data structure. This arrangement allows for the most-recently added inodes to be added to the "end" of the data structure, with the older entries being found toward the "front" of the data structure. (Further details pertaining to this functionality are discussed elsewhere in this disclosure, particularly with respect to the maintenance thread.)

The backup on-disk data structure is updated in 450 to reflect the updated state of the in-core data structure. In one embodiment, the backup on-disk data structure will only include information about inodes that are not in use, rather than including information about all inodes, as is the case with the primary on-disk data structure. In one embodiment, the backup on-disk data structure is a bitmap, although other data structures can be used in other embodiments. Particularly when steps 410 through 440 are performed with respect to a group of inodes (rather than to individual inodes), then one or more of the data structures may be updated with respect to the entire chunk in one pass, rather than having to update each entry individually. This is particularly applicable to the backup on-disk data structure, which can more efficiently be updated in one pass (after some number of inodes have been pre-occupied) rather than having to be updated after every individual transaction.

Figure 5:
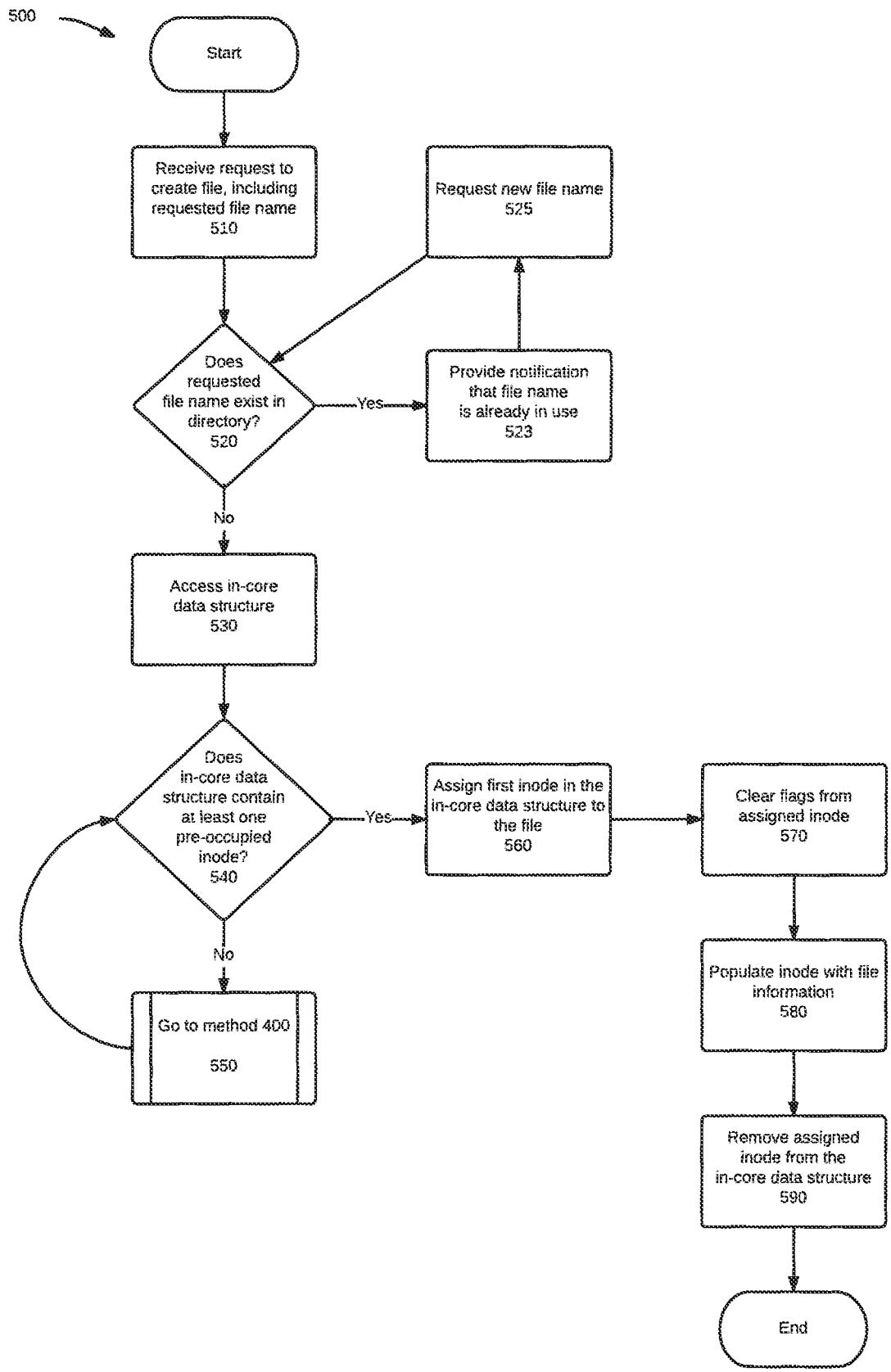
FIG. 5 is a flowchart for assigning inodes to file, according to one embodiment of this disclosure.

FIG. 5 is a flowchart of a method 500 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 500 is described with reference to elements such as those described in connection with FIG. 1.

As shown in FIG. 5, method 500 provides additional actions that can be executed to assign an inode to a file as part of step 220 of FIG. 2. Method 500 begins at 510, when a request to create a file is received. In one embodiment, this request includes a requested file name. In step 520, method 500 determines whether the requested file name already exists in the directory in which the file is being created. If the method determines that the requested file name already exists in the directory, the method proceeds to step 523 and issues a notification that the file name is already in use. In one embodiment, this notification can take the form of an error message. In one embodiment, this notification can take the form of an alert. In other embodiments, the notification can take other forms, or be omitted entirely. In step 525, method 500 requests a different file name from the user, and then repeats step 520 to determine whether the requested file name already exists in the directory in which the file is being created. Steps 520, 523, and 525 can be repeated as necessary, until step 520 determines that the requested file name does not already exist in the directory in which the file is being created. Once step 520 determines that the requested file name does not already exist in the directory in which the file is being created, method 500 then proceeds to step 530.

In step 530, method 500 accesses an in-core data structure (such as, e.g., a list) that contains information about previously-occupied ("pre-occupied") inodes that are now available. In step 540, method 500 determines if the in-core data structure contains at least one pre-occupied inode that is available to be assigned to the new file. If step 540 determines that the in-core data structure does not contain at least one available pre-occupied inode, method 500 proceeds to step 550, and executes one or more steps of method 400. In practice, step 550 should only happen rarely, if ever, but is included in this discussion for the sake of logical completeness. If step 550 is needed, method 500 then loops back to the determination of step 540, after completing the necessary and/or appropriate steps from method 400.

If step 540 determines, at any point during the execution of method 500, that the in-core data structure does contain at least one available pre-occupied inode, method 500 proceeds to step 560. In step 560, method 500 reads information from the in-core data structure to identify the first available pre-occupied inode in the in-core data structure (particularly where, e.g., the in-core data structure takes the form of a FIFO list or queue), and assigns that inode to the new file. In step 570, method 500 clears any flags (such as any extop flags, for example) that were previously set on the inode. In step 580, method 500 populates the selected inode with information associated with the new file for which the request was received in step 510. In one embodiment, the information populated in step 580 includes one or more of information regarding the size of file, the owner of file, a user ID associated with the file, a group ID associated with the file, and one or more timestamps associated with the file (e.g., time created, time last accessed, time last modified, and similar values). In other embodiments, other information may be populated in step 580. In step 590, any reference to the inode that was assigned to the new file (in step 560) is removed from the in-core data structure, since that inode is no longer available to be assigned to a different file. Although shown in a certain sequence in FIG. 5, in practice steps 560, 570, 580, and 590 can be performed in a different order. Moreover, two or more of steps 560, 570, 580, and 590 can be performed at substantially the same time as each other, or as part of a single step or function call in a computer program.

Figure 6:
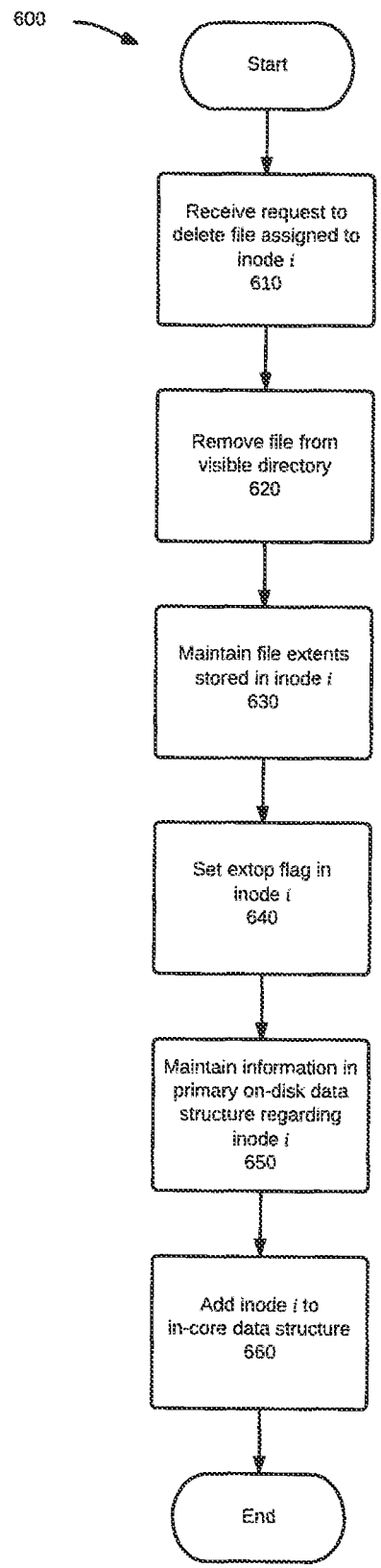
FIG. 6 is a flowchart for deleting files associated with inodes, according to one embodiment of this disclosure.

FIG. 6 is a flowchart of a method 600 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 600 is described with reference to elements such as those described in connection with FIG. 1.

As shown in FIG. 6, method 600 provides additional actions that can be executed to delete a file as part of step 230 of FIG. 2. Method 600 begins at 610, with the receipt of a request to delete a file assigned to a specific inode, denoted in this example as "inode i." After receiving the request to delete the file, method 600 removes the file from the visible directory, as shown in 620. Although the file itself is removed from the visible directory, method 600 nevertheless maintains some, if not all, of the contents of inode i, as shown in 630. These contents are retained, at least in part, because some of the information can be reused if a different file is subsequently assigned to inode i. In the primary embodiment discussed herein, the contents retained in step 630 are extents of the file. In other embodiments, other information can be retained in addition to, or in place of, file extents.

In addition to maintaining extents of inode i, at least for the time being, method 600 also sets an extended operation (or "extop") flag in the inode, as shown in 640. This extop flag indicates that inode i is not in use (e.g., "free" or "available") even though this inode has been allocated, and further indicates that inode i may still be deleted in the future. That is, the extop flag can indicate that some processing may need to occur with respect to this inode in the future, but such processing should not occur at this time. For instance, the maintenance thread may instruct the system to delete inode i if the maintenance thread determines that inode i has expired. In that embodiment, the extop flag indicates that the inode is marked for a deferred deletion. In other embodiments, other extended operations can be indicated by the flag used in this step. In one embodiment, the extop flag used in step 640 is the "IDELICACHE" flag in the VERITAS FILE SYSTEM (VxFS), which indicates that the inode is marked for a deferred deletion. In other embodiments, other flags or descriptive information can be used in this step.

In step 650, method 600 maintains the primary on-disk data structure as that data structure existed prior to deleting the file. Thus, the primary on-disk data structure will continue to contain information indicating that inode i is occupied by a file. As a result, the system will not delete inode i at this time (e.g., unless some subsequent action is invoked to purposely delete inode i, such as one or more of the actions discussed in conjunction with the maintenance thread). In one embodiment, this primary on-disk data structure takes the form of a bitmap. In one version of this embodiment, the bitmap includes a number of bits that is equal to the number of inodes that currently exist in the file system. In one version of this embodiment, the bitmap includes a number of bits that is equal to the maximum number of potential inodes that can exist in the system at any given time. In these versions of this embodiment, the bitmap contains one value (e.g., "1") to indicate every inode that is allocated, and the bitmap contains a different value (e.g., "0") to indicate every inode that is not currently allocated.

In step 660, method 600 adds information identifying inode i to the in-core data structure in order to indicate that inode i is not in use, and therefore available. In one embodiment, the information identifying inode i is a pointer. In one embodiment, the information identifying inode i can be other information identifying the location of the inode i in memory. In one embodiment, the in-core data structure is arranged as a first-in, first-out (FIFO) list, queue, or other FIFO data structure. Particularly in such an embodiment, the information identifying inode i is added to the end of the in-core FIFO data structure. This arrangement allows for the most-recently added inodes to be added to the end of the data structure, with the older entries being found toward the front of the data structure. (Further details pertaining to this functionality are discussed elsewhere in this disclosure, particularly with respect to the maintenance thread.)

Figure 7:
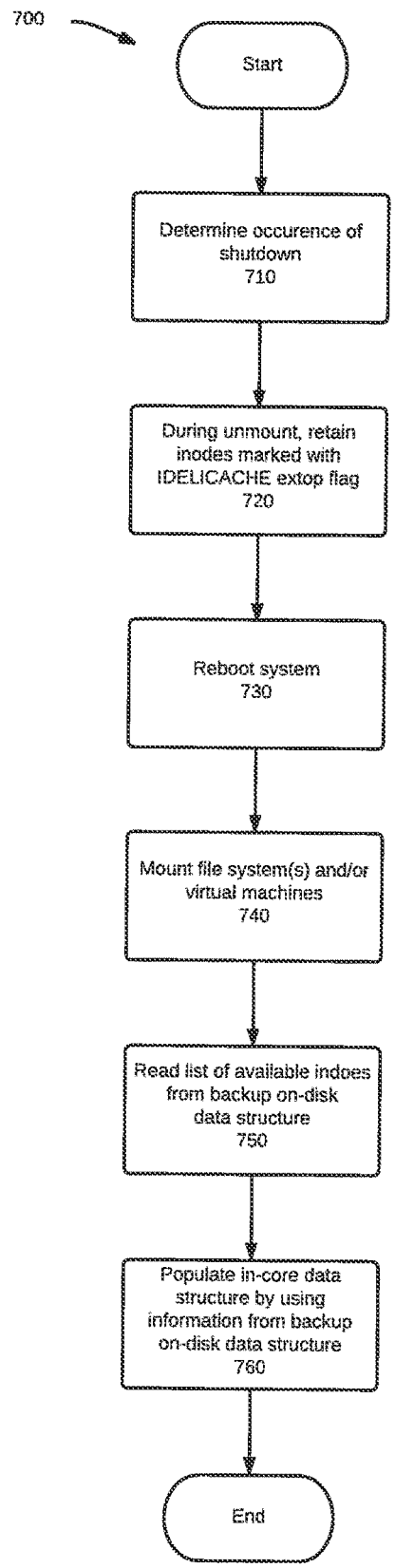
FIG. 7 is a flowchart for providing additional details for processing and recovering from a shutdown, according to one embodiment of this disclosure.

FIG. 7 is a flowchart of a method 700 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 700 is described with reference to elements such as those described in connection with FIG. 1.

As shown in FIG. 7, method 700 provides additional actions that can be executed to process a graceful shutdown (or similar event) as part of step 260 of FIG. 2. Method 700 begins at 710 by determining the occurrence of a system shutdown, such as a file system unmount, among other potential examples. Although not expressly depicted in FIG. 7, method 700 can also be used in the situation of a controlled reboot of the system, or in any other event where the system loses power and non-persistent memory (such as the in-core data structure) is erased. In these scenarios, events such as those described above can also be determined or detected in step 710.

In any event, upon determining or detecting that a system shutdown, or similar event, has been initiated, method 700 unmounts the file system, as shown in 720. During this unmount process, the system may retain any inodes that are marked with a flag (or other descriptor) indicating that the inode was previously occupied (or preoccupied) but is now free (or available) to be assigned to a different file. In one embodiment, the system retains any inodes that are marked with the IDELICACHE extop flag. In other embodiments, other flags or descriptors can be used in place of the IDELICACHE extop flag. In another embodiment that is not expressly depicted in FIG. 7, the system can free any inodes that are not currently in use and which are marked for deferred deletion, such as by an extop flag (or other descriptor). In still other embodiments, this step can be skipped entirely.

Following the reboot of the system in 730, method 700 mounts the relevant file system and/or virtual machines in step 740. In 750, which can be performed either subsequently to step 740 or as part thereof, method 700 reads information about the available inodes from the backup on-disk data structure, e.g., the backup on-disk bitmap. Because the backup on-disk data structure was stored in a persistent memory (e.g., a hard disk), the backup on-disk data structure will have maintained information identifying the previously occupied inodes that had become available prior to the event (e.g., a system shutdown) of 710. In the embodiment depicted in FIG. 7, this information is read in 750, and then used in 760 to repopulate the in-core data structure. In other embodiments, steps 750 and 760 may effectively be merged into a single operation within method 700. In either scenario, 760 uses the information from the on-disk data structure to repopulate the in-core data structure with information identifying the inodes that were previously occupied but which are now free, or available. Thus, step 760 involves adding the information from the on-disk data structure to the in-core data structure, thereby re-creating the on-disk data structure as that on-disk data structure existed prior to the system shutdown (or other event of step 710).

FIG. 8 is a flowchart of a method 800 illustrating various actions performed in connection with one embodiment of the systems and techniques disclosed herein. As will also be appreciated in light of the present disclosure, this method may be modified in order to derive alternative embodiments. Moreover, although the steps in this embodiment are shown in a sequential order, certain steps may occur in a different order than shown, certain steps may be performed concurrently, certain steps may be combined with other steps, and certain steps may be omitted in another embodiment. Method 800 is described with reference to elements such as those described in connection with FIG. 1.

As shown in FIG. 8, method 800 provides additional actions that can be executed to maintain the in-core data structure as part of step 310 of FIG. 3. In one embodiment, the steps of methods 300 and 800 can be performed by one or more threads that are distinct from the thread(s) used to perform the steps of methods 200, 400, 500, 600, and 700. As used herein, the thread(s) used to perform the steps of method 300, as elaborated in method 800, is referred to as a "maintenance thread." In practice, this thread (or threads) may be given a different name, or no name at all. The term "maintenance thread" is used herein primarily for ease of reference and discussion.

Moreover, it will be appreciated that method 800 includes three decision points, as shown in steps 810, 830, and 850. Although depicted and discussed in a certain order in this disclosure, in practice, these steps can be performed in any sequence. In practice, one or more of these steps can be performed at substantially the same time as one or more of the other steps in this group. The order in which these steps are performed does not substantially affect the efficacy of the systems and methods disclosed herein.

Subject to the foregoing qualifications, method 800 begins at step 810, where method 800 determines whether the in-core data structure contains less than a minimum threshold ($T_{min}$) number of entries. If step 810 determines that the in-core data structure contains less than $T_{min}$ entries, method 800 proceeds to steps 820 through 828. Collectively, steps 820, 822, 824, 826, and 828 depict one method for pre-occupying an inode (or batch of inodes), as is shown by the label at the top of the right-most column of FIG. 8. The pre-occupation process of method 800 is substantially similar to the pre-occupying process of method 400, which was discussed above. For ease of discussion, certain details of method 400 will not be expressly repeated below. However, the details of method 400 are generally applicable to the implementation of the pre-occupying process of method 800 (i.e., steps 820, 822, 824, 826, and 828), and should be treated as such by the reader.

The pre-occupation process begins in step 820, where method 800 pre-allocates a sufficient number of inodes to reach $T_{min}$. In one embodiment, pre-allocating each inode involves creating (i.e., pre-allocating) an inode without assigning a file to that inode. In one embodiment, the number of inodes to be pre-allocated at any one time is set by a system administrator, or other user. In other embodiments, the number of inodes to be pre-allocated can be predetermined when the method is coded. In other embodiments, the number of inodes to be pre-allocated can be set in a different manner. The pre-allocation process of step 820 can also include finding one or more locations in a file system in which the inodes are to be stored.

In step 820, the pre-occupying process of method 800 sets an appropriate extop flag (or other appropriate information) in each pre-allocated inode. In 824, the primary on-disk data structure will be updated to indicate that the inode is allocated and therefore unavailable (even though the inode is not actually allocated at this time), as if a file had actually been assigned to the inode. In 826, the pre-occupying process also involves adding information identifying each pre-occupied inode to the in-core data structure, thereby indicating that this inode is actually available despite being marked as unavailable (or allocated) in the primary on-disk data structure. Further, the backup on-disk data structure is updated in 828 to reflect the updated state of the in-core data structure. By performing these steps (or calling on one or more other threads to perform one or more of these steps), the maintenance thread can make a new inode appear to the system as being a previously occupied (i.e., "pre-occupied") inode even if a file was never assigned to this inode. Although steps 820 through 828 are discussed individually above, in practice step 820 may include pre-occupying a group of inodes (i.e., two or more inodes). When step 820 is performed in this manner, then one or more of the data structures may be updated with respect to an entire number of inodes in one pass, rather than having to update each entry individually. This is particularly applicable to the backup on-disk data structure, which can more efficiently be updated in one pass (after the entire number of inodes has been pre-occupied) rather than having to be updated after every individual transaction.

In addition to the above, method 800 also includes step 830. In step 830, method 800 determines whether the in-core data structure contains more than a maximum threshold ($T_{max}$) number of entries. If step 830 determines that the in-core data structure contains more than $T_{max}$ entries, method 800 proceeds to steps 840 through 846. Collectively, steps 840, 842, 844, and 846 depict one method for deleting excess modes, as is shown by the label at the top of the left-most column of FIG. 8.

The deletion of excess inodes from the in-core data structure begins at 840, where method 800 deletes a sufficient number of inodes from the in-core data structure to reach $T_{max}$. In one embodiment, this functionality can be performed with respect to multiple inodes in a single operation or single pass through the in-core data structure. In 842, method 800 deletes the record of the removed inode from the primary on-disk data structure. The deletion of the record might simply include marking the inode free in the primary on-disk data structure. In 844, the backup on-disk data structure is updated to reflect the updated state of the in-core data structure. In step 846, the inode itself is deleted from any file system location(s) in which it was stored. (In one embodiment, the exact locations can be determined by reading the appropriate value from the in-core list prior to deleting the corresponding entry in 820. If deleting the inodes in a group, the individual locations can be stored in a temporary data structure, such as an array, until the appropriate time at which such information is needed for step 846.) Although steps 840 through 846 are discussed individually above, in practice 840 may include removing a group of inodes in batches. Likewise, 846 may include deleting a group of inodes from a file system in batches. When the operations shown in 840 and/or 846 are performed in this manner, then one or more of the data structures may be updated with respect to the entire group of removed inodes in one pass, rather than having to update each entry individually. This is particularly applicable to the backup on-disk data structure, which can more efficiently be updated in one pass (after the whole group of inodes has been remove) rather than having to be updated after every individual transaction.

Moreover, method 800 also includes step 850. In step 850, method 800 determines whether the in-core data structure contains any expired entries. If step 850 determines that the in-core data structure contains one or more expired entries, method 800 then performs steps 860 as well as 842 through 846. Collectively, steps 860, 842, 844, and 846 depict one method for deleting expired, as is shown by the label above step 860 in FIG. 8.

As part of making the determination in step 850, method 800 can reference a time threshold value. In one embodiment, the time threshold value can be 15 minutes. In other embodiments, the time threshold value can have other values. In one embodiment, the time threshold value is set by a system administrator, or other user. In other embodiments, the time threshold value can be predetermined when the method is coded. In the preferred embodiment of this method, the in-core data structure will be a FIFO data structure (such as a list or queue, as discussed elsewhere herein). In certain embodiments, the nature of the data structure as a FIFO data structure is important at this point, as this characteristic of the data structure enables step 850 to determine that none of the entries are expired simply by evaluating the first entry, which will necessarily be the oldest entry when a data structure of this type is used. Moreover, even if one or more entries at the head of the FIFO in-core data structure are expired, step 850 can evaluate each list entry one at a time, starting from the first entry, until step 850 finds the first entry that is not expired. Once step 850 finds the first entry that is not expired (whether that entry is the very first entry, or an entry further down the FIFO in-core data structure), step 850 can safely determine that all of the remaining entries are not expired without having to evaluate them individually, which is again due to the nature of a FIFO data structure used in such embodiments.

To provide further details about the determination in step 850, this step can be performed by reading information associated with the first entry in the in-core data structure to determine when that entry was added to the in-core data structure. After determining when that entry was added to the in-core data structure, method 800 can compare the time added to the current time to determine how long the entry has been in the in-core data structure. In other embodiments, step 850 can determine how long the entry has been in the in-core data structure by reading information associated with the first entry in the in-core data structure directly, thereby skipping the aforementioned time subtraction step. In either situation, after determining how long the entry has been in the in-core data structure, step 850 then compares this value to the time threshold value referenced above. If step 850 determines that the first entry has not expired (i.e., that the first entry has not been in the in-core data structure for longer than allowed by the time threshold), then step 850 can safely conclude that none of the other entries are expired, either, due to the FIFO nature of the data structure. If step 850 determines that the first entry has expired (i.e., that the first entry has been in the in-core data structure for longer than allowed by the time threshold), then step 850 can iteratively evaluate the "next" entry in the in-core data structure until step 850 finds the first entry that is not expired. Once step 850 finds that the first entry has not expired, step 850 can then safely conclude that all of the subsequent entries are expired, either, due again to the FIFO nature of the data structure.

If step 850 determines that one or more entries in the in-core data structure are expired, method 800 proceeds to step 860, wherein the expired entries are removed from the in-core data structure. Either before or after step 860, method 800 also performs steps 842, 844, and 846 if step 850 determines that one or more entries in the in-core data structure are expired. As was the case above, if more than one entry is expired, those entries can be deleted either individually or in a group. When steps 860 and/or 846 are performed in this manner, then one or more of the data structures may be updated with respect to the entire group of removed inodes in one pass, rather than having to update each entry individually. This is particularly applicable to the backup on-disk data structure, which can more efficiently be updated in one pass (after the whole group of inodes has been remove) rather than having to be updated after every individual transaction.

Figure 9:
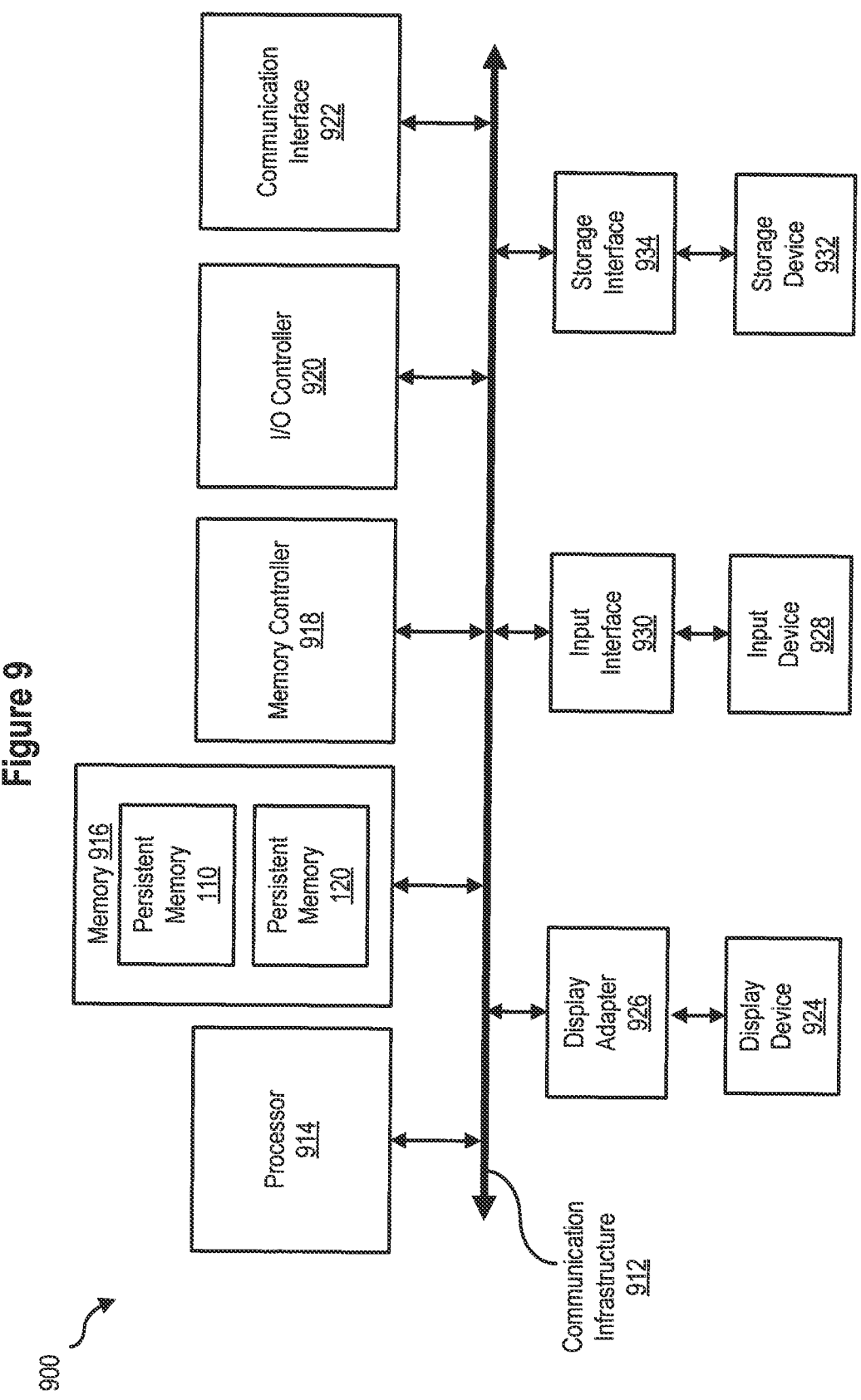
FIG. 9 is a block diagram of a computing device, illustrating how certain features of the instant disclosure can be implemented, according to one embodiment of the present disclosure.

FIG. 9 is a block diagram of a computing system 900 capable of performing one or more of the operations described above. Computing system 900 broadly represents any single or multi-processor computing device or system capable of executing computer-readable instructions. Examples of computing system 900 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 900 may include at least one processor 914 and a memory 916. By executing software that makes use of a persistent memory 110 and a non-persistent memory 120, such as in the manner described herein, computing system 900 becomes a special purpose computing device that is configured to perform operations in the manner described above.

Processor 914 generally represents any type or form of processing unit capable of processing data or interpreting and executing instructions. In certain embodiments, processor 914 may receive instructions from a software application or module. These instructions may cause processor 914 to perform the functions of one or more of the embodiments described and/or illustrated herein. For example, processor 914 may perform and/or be a means for performing the operations described herein. Processor 914 may also perform and/or be a means for performing any other operations, methods, or processes described and/or illustrated herein.

Memory 916 (e.g., persistent memory 110 or non-persistent memory 120 of computer system 100) generally represents any type or form of volatile or non-volatile storage devices or mediums capable of storing data and/or other computer-readable instructions. Examples include, without limitation, random access memory (RAM), read only memory (ROM), flash memory, a hard disk drive, or any other suitable memory device. Although not required, in certain embodiments computing system 900 may include both a volatile memory unit and a non-volatile storage device. In one example, program instructions implementing on or more operations described herein may be loaded into memory 910.

In certain embodiments, computing system 900 may also include one or more components or elements in addition to processor 914 and memory 916. For example, as illustrated in FIG. 9, computing system 900 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an Industry Standard Architecture (ISA), Peripheral Component Interconnect (PCI), PCI express (PCIe), or similar bus) and a network.

Memory controller 918 generally represents any type or form of device capable of handling memory or data or controlling communication between one or more components of computing system 900. For example, in certain embodiments memory controller 918 may control communication between processor 914, memory 916, and I/O controller 920 via communication infrastructure 912. In certain embodiments, memory controller 918 may perform and/or be a means for performing, either alone or in combination with other elements, one or more of the operations or features described and/or illustrated herein.

I/O controller 920 generally represents any type or form of module capable of coordinating and/or controlling the input and output functions of a computing device. For example, in certain embodiments I/O controller 920 may control or facilitate transfer of data between one or more elements of computing system 900, such as processor 914, memory 916, communication interface 922, display adapter 926, input interface 930, and storage interface 934.

Communication interface 922 broadly represents any type or form of communication device or adapter capable of facilitating communication between computing system 900 and one or more additional devices. For example, in certain embodiments communication interface 922 may facilitate communication between computing system 900 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 900 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 922 may also allow computing system 900 to engage in distributed or remote computing. For example, communication interface 922 may receive instructions from a remote device or send instructions to a remote device for execution.

As illustrated in FIG. 9, computing system 900 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer) for display on display device 924.

As illustrated in FIG. 9, computing system 900 may also include at least one input device 928 coupled to communication infrastructure 912 via an input interface 930. Input device 928 generally represents any type or form of input device capable of providing input, either computer or human generated, to computing system 900. Examples of input device 928 include, without limitation, a keyboard, a pointing device, a speech recognition device, or any other input device.

As illustrated in FIG. 9, computing system 900 may also include a storage device 932 coupled to communication infrastructure 912 via a storage interface 934. Storage device 932 generally represents any type or form of storage device or medium capable of storing data and/or other computer-readable instructions. For example, storage device 932 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage device 932 and other components of computing system 900. A storage device like storage device 932 can store information such as the data structures described herein, as well as one or more computer-readable programming instructions that are capable of causing a computer system to execute one or more of the operations described herein.

In certain embodiments, storage device 932 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage device 932 may also include other similar structures or devices for allowing computer software, data, or other computer-readable instructions to be loaded into computing system 900. For example, storage device 932 may be configured to read and write software, data, or other computer-readable information. Storage devices 932 may also be a part of computing system 900 or may be a separate device accessed through other interface systems.

Many other devices or subsystems may be connected to computing system 900. Conversely, all of the components and devices illustrated in FIG. 9 need not be present to practice the embodiments described and/or illustrated herein. The devices and subsystems referenced above may also be interconnected in different ways from that shown in FIG. 9.

Computing system 900 may also employ any number of software, firmware, and/or hardware configurations. For example, one or more of the embodiments disclosed herein may be encoded as a computer program (also referred to as computer software, software applications, computer-readable instructions, or computer control logic) on a non-transient computer-readable storage medium. Examples of non-transient computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 900 for storage in memory via a network such as the Internet or upon a carrier medium.

The non-transient computer-readable storage medium containing the computer programming instructions may be loaded into computing system 900. All or a portion of the computer programming instructions stored on the non-transient computer-readable storage medium may then be stored in memory 916 and/or various portions of storage device 932. When executed by processor 914, a computer program loaded into computing system 900 may cause processor 914 to perform and/or be a means for performing the functions of one or more of the embodiments described and/or illustrated herein. Additionally or alternatively, one or more of the embodiments described and/or illustrated herein may be implemented in firmware and/or hardware. For example, computing system 900 may be configured as an application specific integrated circuit (ASIC) adapted to implement one or more of the embodiments disclosed herein.

FIG. 10 is a block diagram of a network architecture 1000 in which client systems 1010, 1020, and 1030, and servers 1040 and 1045 may be coupled to a network 1050. Client systems 1010, 1020, and 1030 generally represent any type or form of computing device or system, such as computing system 900 in FIG. 9.

Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet. In one example, one or more of client systems 1010, 1020, and/or 1030 may include a persistent memory (such as, e.g., persistent memory 110) and a non-persistent memory (such as, e.g., persistent memory 120) as shown in FIG. 1.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as Network File System (NFS), Server Message Block (SMB), or Common Internet File System (CIFS). Such storage devices can store backup information and storage configuration information, as described above.

Servers 1040 and 1045 may also be connected to a storage area network (SAN) fabric 1080. SAN fabric 1080 generally represents any type or form of computer network or architecture capable of facilitating communication between multiple storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached storage devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to computing system 900 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 1040, server 1045, storage devices 1040(1)-(N), storage devices 1070(1)-(N), storage devices 1090(1)-(N), intelligent storage array 1095, or any combination thereof. All or a portion of one or more of the embodiments disclosed herein may also be encoded as a computer program, stored in server 1040, run by server 1045, and distributed to client systems 1010, 1020, and 1030 over network 1050.

In some examples, all or a portion of one of the systems in FIGS. 1, 9, and 10 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, one or more of the operations described herein may transform the behavior of a computer system such that the various operations described herein can be performed.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
   determining whether an in-core data structure comprises an adequate number of entries, wherein
   the in-core data structure is stored in a non-persistent computer-readable storage medium,
   the in-core data structure comprises a plurality of entries, and
   each of the entries comprises information identifying a respective inode of a plurality of inodes as being available; and
   in response to a determination that the in-core data structure does not comprise an adequate number of entries, performing a first maintenance action, wherein
   the first maintenance action is one of a plurality of maintenance actions, and
   the plurality of maintenance actions comprises
   pre-occupying one or more inodes of the plurality of inodes, and
   removing the one or more inodes.

2. The method of claim 1, further comprising:
   determining whether the in-core data structure comprises an expired entry; and
   in response to a determination that the in-core data structure comprises the expired entry, removing the expired entry from the in-core data structure.

3. The method of claim 1, wherein
   the determination that the in-core data structure does not comprise the adequate number of entries is a determination that the in-core data structure comprises less than a minimum number of entries.

4. The method of claim 3, wherein the pre-occupying the one or more inodes comprises:
   pre-allocating a sufficient number of inodes to reach a minimum number of inodes, wherein the sufficient number of inodes is a difference between
the minimum number of inodes and a current number
of inodes, and
setting a flag for each of the one or more inodes, wherein
each flag is configured to indicate that the each of the
one or more inodes is at least one of
allocated, and
unavailable.

5. The method of claim 4, wherein
the pre-occupying the one or more inodes further comprises at least one of
marking each of the one or more inodes as being allocated in a primary on-disk data structure, or
adding information identifying each of the one or more inodes to the in-core data structure.

6. The method of claim 1, wherein
the determination that the in-core data structure does not comprise the adequate number of entries is a determination that the in-core data structure comprises more than a maximum number of entries.

7. The method of claim 1, wherein the removing the one or more inodes comprises:
removing a sufficient number of inodes to reach a maximum number of inodes, wherein
the sufficient number of inodes is a difference between a current number of inodes and the maximum number of inodes, and
each inode that is removed, deleting a corresponding record from a primary on-disk data structure.

8. A system comprising:
a microprocessor; and
a non-transient computer-readable storage medium, comprising computer instructions executable by the microprocessor and configured to perform a method comprising
determining whether an in-core data structure comprises an adequate number of entries, wherein
the in-core data structure is stored in a non-persistent computer-readable storage medium,
the in-core data structure comprises a plurality of entries, and
each of the entries comprises information identifying a respective inode of a plurality of inodes as being available; and
in response to a determination that the in-core data structure does not comprise an adequate number of entries, performing a first maintenance action, wherein
the first maintenance action is one of a plurality of maintenance actions, and
the plurality of maintenance actions comprises
pre-occupying one or more inodes of the plurality of inodes, and
removing the one or more inodes.

9. The system of claim 8, wherein the method further comprises:
determining whether the in-core data structure comprises an expired entry; and
in response to a determination that the in-core data structure comprises the expired entry, removing the expired entry from the in-core data structure.

10. The system of claim 8, wherein
the determination that the in-core data structure does not comprise the adequate number of entries is a determination that the in-core data structure comprises less than a minimum number of entries.

11. The system of claim 10, wherein the pre-occupying the one or more inodes comprises:
pre-allocating a sufficient number of inodes to reach a minimum number of inodes, wherein
the sufficient number of inodes is a difference between the minimum number of inodes and a current number of inodes, and
setting a flag for each of the one or more inodes, wherein
each flag is configured to indicate that the each of the one or more inodes is at least one of
allocated, and
unavailable.

12. The system of claim 11, wherein
the pre-occupying the one or more inodes further comprises at least one of
marking each of the one or more inodes as being allocated in a primary on-disk data structure, or
adding information identifying each of the one or more inodes to the in-core data structure.

13. The system of claim 8, wherein
the determination that the in-core data structure does not comprise the adequate number of entries is a determination that the in-core data structure comprises more than a maximum number of entries.

14. The system of claim 8, wherein the removing the one or more inodes comprises:
removing a sufficient number of inodes to reach a maximum number of inodes, wherein
the sufficient number of inodes is a difference between a current number of inodes and the maximum number of inodes, and
each inode that is removed, deleting a corresponding record from a primary on-disk data structure.

15. A computer program product, comprising a plurality of instructions stored on a non-transient computer-readable storage medium, wherein the instructions are configured to execute a method comprising:
determining whether an in-core data structure comprises an adequate number of entries, wherein
the in-core data structure is stored in a non-persistent computer-readable storage medium,
the in-core data structure comprises a plurality of entries, and
each of the entries comprises information identifying a respective inode of a plurality of inodes as being available; and
in response to a determination that the in-core data structure does not comprise an adequate number of entries, performing a first maintenance action, wherein
the first maintenance action is one of a plurality of maintenance actions, and
the plurality of maintenance actions comprises
pre-occupying one or more inodes of the plurality of inodes, and
removing the one or more inodes.

16. The computer program product of claim 15, wherein the method further comprises:
determining whether the in-core data structure comprises an expired entry; and
in response to a determination that the in-core data structure comprises the expired entry, removing the expired entry from the in-core data structure.

17. The computer program product of claim 15, wherein
the determination that the in-core data structure does not comprise the adequate number of entries is a determination that the in-core data structure comprises less than a minimum number of entries.

18. The computer program product of claim 17, wherein the pre-occupying the one or more inodes comprises:
   pre-allocating a sufficient number of inodes to reach a minimum number of inodes, wherein
      the sufficient number of inodes is a difference between the minimum number of inodes and a current number of inodes, and
   setting a flag for each of the one or more inodes, wherein each flag is configured to indicate that the each of the one or more inodes is at least one of
      allocated, and
      unavailable.

19. The computer program product of claim 15, wherein the determination that the in-core data structure does not comprise the adequate number of entries is a determination that the in-core data structure comprises more than a maximum number of entries.

20. The computer program product of claim 15, wherein the removing the one or more inodes comprises:
   removing a sufficient number of inodes to reach a maximum number of inodes, wherein
      the sufficient number of inodes is a difference between a current number of inodes and the maximum number of inodes, and
      each inode that is removed, deleting a corresponding record from a primary on-disk data structure.

* * * * *